United States Patent [19]
Minoda et al.

[11] Patent Number: 5,521,766
[45] Date of Patent: May 28, 1996

[54] METHOD AND APPARATUS FOR REPRODUCING DIGITAL ACOUSTIC AND VIDEO SIGNALS

[75] Inventors: Hidenori Minoda; Hiroyuki Ishizaki, both of Higashihiroshima, Japan

[73] Assignee: Sharp Kabushiki Kaisha, Japan

[21] Appl. No.: 209,483

[22] Filed: Mar. 14, 1994

Related U.S. Application Data

[63] Continuation of Ser. No. 871,754, Apr. 2, 1992, abandoned.

[30] Foreign Application Priority Data

Apr. 23, 1991 [JP] Japan ....................................... 3-92164

[51] Int. Cl.⁶ ..................................................... H04N 5/78
[52] U.S. Cl. ............................ 360/9.1; 360/33.1; 360/61; 360/11.1
[58] Field of Search ................................. 360/33.1, 19.1, 360/35.1, 36.1, 61, 9.1, 11.1; 358/341, 335

[56] References Cited

U.S. PATENT DOCUMENTS

| | | | |
|---|---|---|---|
| 4,451,857 | 5/1984 | Mikado | 358/312 |
| 4,761,692 | 8/1988 | Yoshida et al. | 360/77.02 X |
| 4,774,599 | 9/1988 | Baumeister | 360/11.1 |
| 4,849,833 | 7/1989 | Yoshimura et al. | 360/36.2 |
| 4,858,032 | 8/1989 | Okada et al. | 360/9.1 |
| 5,136,394 | 8/1992 | Haikawa et al. | 360/33.1 X |
| 5,138,500 | 8/1992 | Haikawa et al. | 360/36.1 X |
| 5,138,501 | 8/1992 | Ii et al. | 360/72.2 |

FOREIGN PATENT DOCUMENTS

| | | |
|---|---|---|
| 62-65575 | 3/1987 | Japan . |
| 1-267870 | 10/1989 | Japan . |

*Primary Examiner*—Andrew L. Sniezek
*Attorney, Agent, or Firm*—Nixon & Vanderhye

[57] ABSTRACT

In a data recording and reproducing apparatus for writing the video signals read out from a magnetic tape (11) alternately into image memories, and reading out and reproducing the video signals from the image memory not used for writing video signals, the video signal read out from the image memory when the memory indication switch (SW1) is manipulated is directly held in the image memory, and when reproducing the video signal executed in succession, using the image memory in which video signals is not preserved, writing of video signal from the magnetic tape (11) into image memory and reading from the image memory are effected. In this reproducing action, when the reproduction indication switch (SW2) is manipulated, and previously preserved video signal is read out from the image memory and reproduced. Therefore, by keeping the video signal desired to be reproduced frequently in the image memory, it may be reproduced as required, and therefore the waiting time until the desired video signal is displayed may be notably shortened.

17 Claims, 4 Drawing Sheets

| 1ch, 2ch | | A1 | A2 | A3 | A4 |
|---|---|---|---|---|---|
| 3ch, 1ch | V1 | V2 | V3 | V4 | |

METHOD AND APPARATUS FOR REPRODUCING DIGITAL ACOUSTIC AND VIDEO SIGNALS

This is a continuation of application Ser. No. 07/871,754, filed Apr. 21, 1992, now abandoned.

BACKGROUND OF THE INVENTION

1. Field of the Invention

The present invention relates to a data recording and reproducing apparatus such as digital audio tape recorder (DAT) for combining and recording signals in plural channels, and reproducing the recorded signals by individual channel.

2. Description of the Related Art

As one of the conventional apparatus for recording and reproducing data, a DAT converts an audio signal into a digital signal for recording on a magnetic tape, and converts the digital signal recorded in the magnetic tape into an audio signal.

Information for error correction, such as parity, can also be recorded. Therefore the original sound can be reproduced at high fidelity, and sound reproduction at a very low noise level is realized.

In some of the products of the conventional DAT, it is either of two-channels or four channels which can be selected: in a two-channel mode of operation two channels individually record two kinds of audio signals on the magnetic tape, or in a four-channel mode, four channels individually record four kinds of audio signals on the magnetic tape.

In the two-channel mode, two kinds of audio signal corresponding to two speakers disposed at the front left side and front right side of the listener are recorded in the magnetic tape, and in the four-channel mode, four kinds of audio signal corresponding to four speakers disposed at the front left side, front right side, rear left side and rear right side of the listener.

In the four-channel mode, hitherto is known a method of DAT (the Japanese Unexamined Patent Publication (KOKAI) No. JP-A 1-267870(1989)) for recording audio signals in two channels and still picture video signals in the other two channels, and reproducing audio signals and video signals simultaneously from one magnetic tape. In this DAT system, for example, two image memories are prepared for storing the video signals of one screen, and when recording, the video signals of one screen are sequentially written during a specific time period (hereinafter called the first period) in one of the image memories before being recorded in the magnetic tape, and the video signals are read out from the same image memory in a specific time period (the second period) longer than the first period and recorded onto the magnetic tape.

At this time, the audio signal corresponding to the video signal is, before being recorded in a magnetic tape, sequentially written in the remaining area image memory not used for writing of video signal in the second period, and, after completion of writing, is read out from the image memory in the same second period and recorded in the magnetic tape.

Consequently, in the magnetic tape, the still picture video signals for one screen and the corresponding audio signals of narration or the like are recorded as a pair in one block. That is, in the first half recording region of one block, the still picture video signals are recorded, and in the latter half recording region, the audio signals are recorded.

When reproducing, the video signals for one screen read out from the magnetic tape are written sequentially into one of the image memories in the second period. After completion of writing, the video signals for one screen are read out and reproduced from the image memory in the first period.

At this time, the audio signals read out from the magnetic tape next to the video signals are reproduced in the second period. Accordingly, when the still picture video signals for one screen are reproduced, the audio signals of the narration or the like corresponding to the still picture are reproduced in parallel.

In this DAT, when reading and reproducing an arbitrary video signal, the desired video signal is searched on the basis of sub-code data (frame number, chapter number, etc.) which are identification information recorded on the magnetic tape together with the video signal. The video signal is read out from the searched recording region and reproduced. This searching action is executed even while reproducing the magnetic tape. That is, the recording region in which the video signal being presently reproduced is recognized on the basis of the sub-code data, and the magnetic tape is fast-forwarded or rewound up to the recording region where the video signal desired to be reproduced is recorded.

Therefore, for example, if the present reproducing position is near the end of a magnetic tape, and the video signal to be reproduced is recorded near the beginning of the magnetic tape, the magnetic tape rewinding time is long. For example, in the case of a 46-minute tape, it takes about 30 seconds. Accordingly, while searching the magnetic tape, the video signal being reproduced just before is kept in display, or a blue screen is displayed in a so-called blue back state.

SUMMARY OF THE INVENTION

It is hence a primary object of the invention to present a data recording and reproducing apparatus capable of displaying the video signal desired to be frequently displayed instantly without requiring the above searching action.

To achieve the above object, the invention presents a data recording and reproducing apparatus having plural memory means for storing video signals in unit time individually, for writing the video signals in unit time sequentially in a first period in at least one of the plural memory means when recording, and reading out the memory content of the memory means in a second period, and recording in a magnetic tape, and when reproducing, writing the video signals in unit time read out from the magnetic tape sequentially in the second period into the plural memory means, and reading out and reproducing the video signals in the first period in each memory means finishing the writing of the video signals in unit time, which comprises memory control means provided with a memory indication switch for holding the video signals being reproduced when the memory indication switch is manipulated directly in the specific memory means in which the video signals are recorded, and reproducing the video signal by using the remaining memory means, and reproducing means provided with a reproduction indication switch for reading out and reproducing the video signals from the specific memory means in the first period when the reproduction indication switch is manipulated at the time of reproduction.

According to the invention, when the memory indication switch is manipulated during reproduction of a specific video signal, the specific video signal is held directly in the memory means. Afterwards, during the subsequent reproduction, when the reproduction indication switch is manipulated, the specific video signal is read out and displayed.

Thus, in the data recording and reproducing apparatus of the invention, a desired video signal may be held in the memory means while reproducing, and the video signal may be read and reproduced as required. Therefore, for example, the video signal desired to be reproduced frequently may be kept in the memory means according to the above operation, and may be reproduced as required, so that it is not necessary to record the same video signal plural times on the same magnetic tape, thereby enhancing the recording efficiency of the magnetic tape. Besides, it is not necessary to search the magnetic tape every time the video signal desired to be reproduced is needed, and the waiting time until the video signal is displayed is shortened.

The invention also presents a data recording and reproducing apparatus comprising:

plural memory means for storing video signals in unit time individually, recording means for writing the video signals in unit time in at least one of the plural memory means sequentially in a first period, and reading out the memory content of the memory means in a second period and recording in a magnetic tape, and reproducing means for writing the video signals in unit time read out from the magnetic tape into the plural memory means sequentially in the second period, and reading out and reproducing the video signals in the first period in every memory means finishing the writing of the video signals in unit time, wherein the reproducting means comprises a memory indication switch and a reproduction indication switch and holds, when the memory indication switch is manipulated, the video signal being reproduced at that time directly in specific memory means in which the video signal is written, and reproduces the video signal by using the remaining memory means, and, when the reproduction indication switch is manipulated, reads out and reproduces the video signal from the specific memory means in the first period.

The invention further presents a data recording and reproducing apparatus for recording video signals and audio signals in a magnetic tape as digital signals, comprising:

plural memory means for storing video signals in unit time individually, for writing, when recording, the video signals in unit time in at least one of the plural memory means sequentially in a first period, and reading out and recording the memory content of the memory means in a second period longer than the first period, and selectively performing, when reproducing, a first reproducing action in which the video signals in unit time are written in the plural memory means sequentially in the second period, and the video signals are read out and reproduced in the first period in every memory means finishing the writing of video signals in unit time, and a second reproduction action in which the video signals in unit time are held in specific memory means of the plural memory means, the first reproducing action is executed by using the remaining memory means, and the video signals in unit time stored in the specific memory means are reproduced as required, the audio signals are, when recording or reproducing, sequentially written in the second period into one of the remaining memory means not used for writing/reading of video signals, and the stored audio signals are, after completion of the writing, read out in the second period to be recorded or reproduced.

In the invention, plural memory means for storing video signals in unit time are provided, and video signals and audio signals are recorded in a magnetic lade as digital signals. In recording, the video signals in unit time are written into at least one of the plural memory means sequentially in a first period. The recording action on the magnetic tape is effected by reading out the memory content in the memory means in a second period longer than the first period. In reproducing, the video signals in unit time are written in the plural memory means sequentially in the second period. The written video signals are read out and reproduced in the first period in every memory means finishing the writing of the video signals in unit time.

The audio signals are, when recording or reproducing, sequentially written in the second period in one of the remaining memory means not used for writing/reading of video signals. After completion of this writing action, the stored audio signals are read out in the second period, and recorded or reproduced.

The first period is sufficiently shorter than the second period, and in the case of the audio signal is stored at the time of recording, the audio signal is recorded in delay but the second period as compared with the video signal. Accordingly, at the time of reproduction, the video signals in unit time are written in one of the plural memory means in the second period, and after this writing, when the written video signal is read out, the audio signal corresponding to this video signal being read out is read in from the magnetic tape to be turned into a sound. Therefore, the picture and sound correspond to each other.

Meanwhile, when the audio signal is stored at the time of reproducing, in reproducing, the video signal in unit time are written in one of the plural memory means in the second period, and the audio signal corresponding to the video signals is also stored in the second period. While the video signal is being read out, the audio signal corresponding to this video signal is read out to be turned into a sound. Thus, reproduction is effected while keeping the correspondence between the picture and sound.

When the memory indication switch is manipulated while a specific video signal is reproduced, the specific video signal is directly held in the memory means, and the video signals are produced by using the remaining memory means. When the reproduction indication switch is manipulated during this reproduction, the specific video signal is read out from the memory means and reproduced.

The invention also presents a data recording and reproducing apparatus for recording video signals and audio signals in a magnetic tape as digital signals comprising:

plural memory means for storing video signals in unit time individually, video signal recording means for writing video signals in unit time in at least one of the plural memory means sequentially in a first period, and reading out and recording the memory content of the memory means in a second period, video signal reproducing means for writing video signals in unit time read out from the magnetic tape into the plural memory means sequentially in a second period, and reading out and reproducing the video signals in the first period in every memory means finishing the writing of video signals in unit time, and audio signal recording and reproducing means for writing, at the time of recording or reproducing video signals, the audio signals in the second period in one of the remaining memory means not used for writing/reading of video signals, and reading out the stored audio signals in the second period, after completion of the writing, and recording or reproducing, wherein the video signal reproducing means comprises a memory indication switch and a reproduction indication switch, and holds, when the memory indication switch is manipulated, the video signal reproduced at this time directly in specific memory means in which the video signal is written, and reproduces the video signal by using the remaining memory means, and, when the reproduction indication switch is manipulated, reads out and reproduces the video signal from the specific memory means in the first period.

In the invention, moreover, two memory means are used, and, at the time of reproduction, the video signal is held in either one memory means, and when reproducing the video signal by using the other memory means only, in the period of writing of the video signal into the other memory means, the video signal from the video signal output circuit for producing the video signal at a predetermined specific level is produced.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
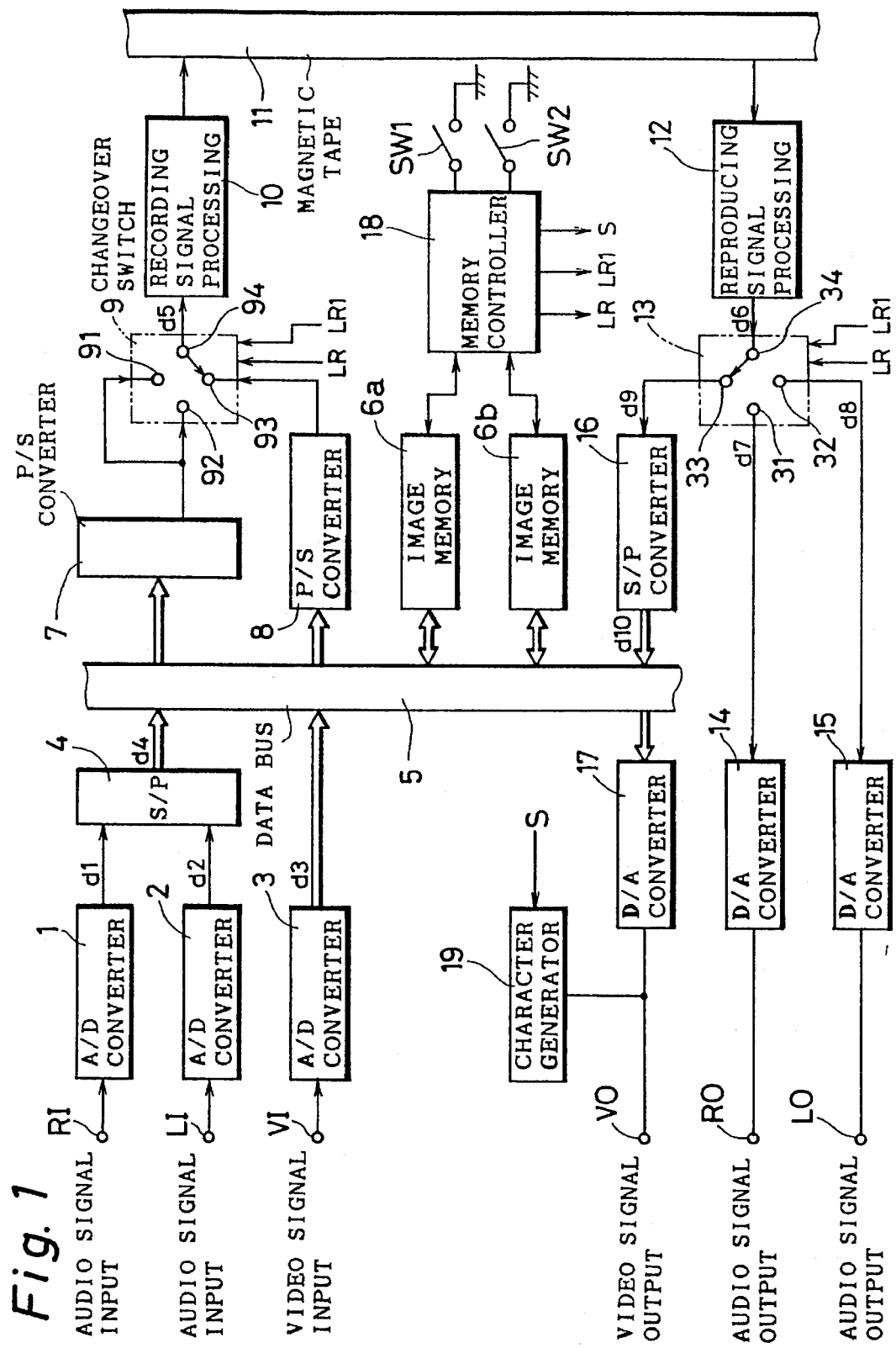
FIG. 1 is a block diagram showing a schematic constitution of a data recording and reproducing apparatus in an embodiment of the invention.

Now referring to the drawing, preferred embodiments of the invention are described below.

FIG. 1 is a block diagram showing a schematic constitution of a data recording and reproducing apparatus in an embodiment of the invention. This data recording and reproducing apparatus is a DAT capable of selecting a four channel mode as the operating mode as mentioned above. Two of the four channels are assigned for recording and reproducing two kinds of audio signals, and the other two channels are assigned for recording and reproducing still picture video signals.

An input terminal RI is a terminal for receiving one kind of audio signal, and in this case the audio signal is, for example, the audio signal to the produced from the speaker located at the front right side of the listener. Other input terminal LI is a terminal for receiving the other kind of audio signal, and in this case the audio signal is, for example, the audio signal to be produced from the speaker located at the front left side of the listener.

Another input terminal VI is a terminal for receiving a still picture video signal. These input terminals RI, LI, VI are connected to the corresponding analog/digital (A/D) conversion circuits 1, 2, 3, respectively.

The A/D conversion circuits 1, 2 possess the function for sampling the audio signals coming in from the corresponding input terminals RI, LI respectively at a sampling frequency of, for example, 32 kHz, and converting into, for example, 12-bit digital audio signals d1, d2. The A/D conversion circuits 1, 2 are connected to a serial/parallel (S/P) conversion circuit 4 in the next stage.

The A/D conversion circuit 3 possesses the function for sampling the video signal coming in from the corresponding input terminal VI at a sampling frequency of, for example, 14.3 MHz, and converting into, for example an 8-bit digital video signal d3. The digital video signal d3 converted in this A/D conversion circuit 3 is given to a data bus 5 in the next stage.

The S/P conversion circuit 4 possesses the function for converting the digital audio signals d1, d2 sent from the A/D conversion circuits 1, 2 into a parallel digital audio signal d4 of, for example, 8 bits each, and the converted digital audio signal d4 is given to the data bus 5.

Two image memories 6a, 6b are connected to the data bus 5. One of the image memories 6a, 6b is used for temporarily storing the digital video signal d3 for one screen portion produced from the A/D conversion circuit 3, while the other one is used for temporarily storing the digital audio signal d4 produced from the S/P conversion circuit 4.

The still picture for one screen portion is expressed by the video signals in a period of one field, that is, a period of 1/60 sec. Therefore, it takes 1/60 sec for writing the digital video signal d3 for one screen portion corresponding to the image memories 6a, 6b.

To the data bus 5, furthermore, a parallel/serial (P/S) conversion circuit 7 for audio signal, and a P/S conversion circuit 8 for video signal are connected. The P/S conversion circuit 7 is a circuit for converting the 8-bit digital audio signal d4 read out from one of the image memories 6a, 6b from parallel signal to serial signal, and producing, and the other P/S conversion circuit 8 is a circuit for converting the 8-bit digital video signal d3 read out from the other one of the image memories 6a, 6b from parallel signal to serial signal.

The output terminal of the P/S conversion circuit 7 is connected commonly to input terminals 91, 92 of a changeover switch 9, and the output terminal of the other P/S conversion circuit 8 is connected to another input terminal 93 of the changeover switch 9.

The changeover switch 9 possesses the function for changing over sequentially and cyclically to apply digital audio signals and digital video signals led out to the input terminals 91 to 93 selectively to an output terminal 94, and the output terminal 94 is connected to a recording signal processing circuit 10 in the next stage.

The recording signal processing circuit 10 modulates an incoming digital signal d5, adds information for error correction or other subsidiary information to the incoming digital signal d5, and records the signal processed in the recording signal processing circuit 10 on a magnetic tape 11 by means of a rotary head (not shown) or the like.

A reproducing signal processing circuit 12 takes the digital signal read out from the magnetic tape 11 by the rotary head demodulates it, corrects errors using the subsidiary information read out, and connects its output terminal to an input terminal 34 of a changeover switch 13.

The changeover switch 13 possesses output terminals 31, 32, 33, and the function for changing over sequentially and cyclically to apply the digital signal led out to the input terminal 34 from the signal processing circuit 12 into the output terminals 31 to 33 selectively. Of them, the output terminals 31, 32 are connected to the corresponding digital/analog (D/A) conversion circuits 14, 15 respectively.

The D/A conversion circuits 14, 15 possess the function for converting the digital signals d7, d8 led out to the output terminals 31, 32 of the changeover switch 13 to analog signals. The output terminals of the D/A conversion circuits 14, 15 are connected to the corresponding output terminals R1, L1, respectively.

The other output terminal 33 of the changeover switch 13 is connected to a S/P conversion circuit 16. The S/P conversion circuit 16 possesses the function for converting the digital signal d9 led out to the output terminal 33 of the changeover switch 13 into an 8-bit parallel signal, and producing. The digital signal d10 converted in the S/P conversion circuit 16 is given to the data bus 5.

In reproducing, the digital signal d10 provided by the S/P conversion circuit 16 to the data bus 5 is written into either one of the two image memories 6a, 6b.

Another D/A conversion circuit 17 is connected to the data bus 5. This D/A conversion circuit 17 possesses the function for converting the digital signals read out from the image memories 6a, 6b into analog signals at the time of reproduction. The output terminal of the D/A conversion circuit 17 is connected to the output terminal VO. The output terminal VO is connected to a character generating circuit 19 for producing a blue back signal for making the display screen blue.

A memory control circuit 18 holds the digital video signal of the image memory being read at the time, when a memory indication switch SW1 is turned on, directly in the memory, and reading out the held digital video signal when a reproduction indication switch SW2 is turned on.

Figure 2:
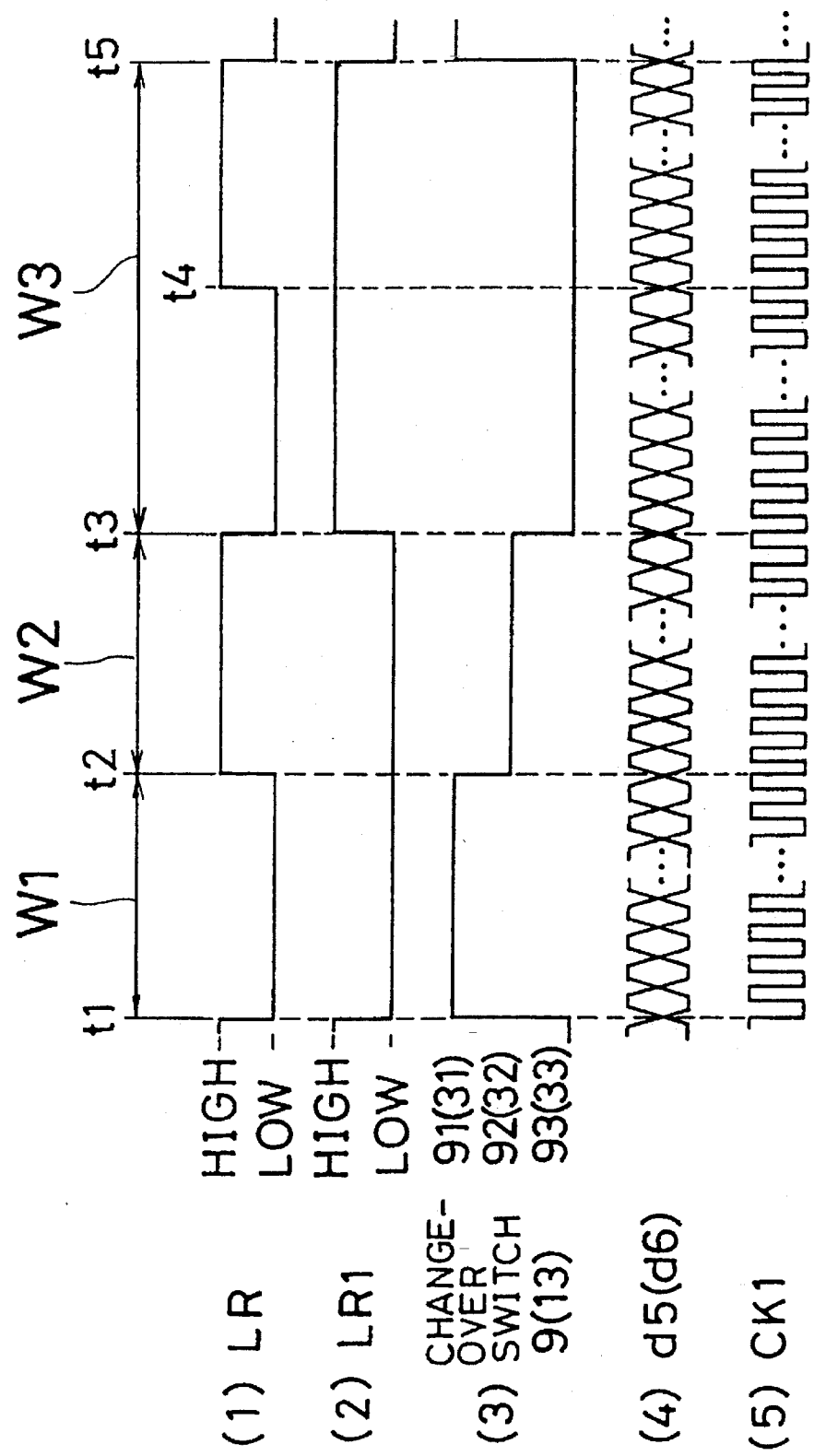
FIG. 2 is a timing chart showing the recording/reproducing action of the data recording and reproducing apparatus in the embodiment.

FIG. 2 is a timing chart for explaining the operation of the DAT mentioned above. FIG. 2 (1) and FIG. 2 (2) indicate changeover control signals LR, LR1 given to the changeover switch 9 (13), respectively, and FIG. 2 (3) shows the changeover action of the changeover switch 9 (13), FIG. 2 (4) shows the digital signal d5 (d6) led out to an output terminal 94 (input terminal 34) of the changeover switch 9 (13), and FIG. 2 (5) shows a clock signal CK1 generated inside the recording signal processing circuit 10 (reproducing signal processing circuit 12).

In FIG. 2 (3), meanwhile, changes of the input terminals 91, 92, 93 (output terminals 31, 32, 33) connected to the output terminal 94 (input terminal 34) of the changeover switch 9 (13) are shown.

Referring now to the timing chart in FIG. 2, the recording and reproducing actions of the DAT are explained below.

Recording

When changeover control signals LR, LR1 are both at low level, the output terminal 94 (input terminal 34) of the changeover switch 9 (13) is connected to the input terminal 91 (output terminal 31). When the changeover control signal LR1 is at low level and the changeover control signal LR is at high level, it is connected to the input terminal 92 (output terminal 32), and when the changeover control signal LR1 is at high level, it is connected to the input terminal 93 (output terminal 33).

In the period W1 from time t1 to t2, the changeover control signals LR, LR1 are both at low level, and therefore the output terminal 94 is connected to the input terminal 91. Accordingly, the digital audio signal from the P/S conversion circuit 7 is given to the recording signal processing circuit 10. The digital audio signal given to the recording signal processing circuit 10 in this period W1 is, for example, the audio signal corresponding to the speaker located at the front right side of the listener.

In the recording signal processing circuit 10, the digital signal d5 led out to the output terminal 94 is received bit by bit in synchronism with the rise of clock signal CK1.

In the period W2 from time t2 to t3, the changeover control signal LR is at high level, and the changeover control signal LR1 is at low level. In this period, therefore, the digital audio signal led out to the input terminal 92 from the P/S conversion circuit 7 is received by the recording signal processing circuit 10. The digital audio signal in this period is the audio signal corresponding to the speaker located at the front left side of the listener.

In the period W3 from time t3 to t5, the changeover control signal LR is at high level, and the output terminal 94 of the changeover switch 9 is connected to the input terminal 93. In this period, therefore, the digital video signal from the P/S conversion circuit 8 is fed into the recording signal processing circuit 10 bit by bit.

At time t4, the changeover control signal LR rises, and becomes high level in the period from time t4 to t5, but, in this period, the changeover switch 9 does not perform changeover action corresponding to the change of the changeover control signal LR.

The sampling frequency in the A/D conversion circuits 1, 2 is selected, for example, at 32 kHz as mentioned above, while the frequency of the changeover control signal LR1 is also set at 32 kHz.

The analog audio signal applied in the A/D conversion circuits 1, 2 is converted into 12-bit digital audio signals d1, d2 herein, and therefore the digital audio signals taken into the recording signal processing circuit 10 in the period W1, W2 are both 12-bit digital signals. Therefore, the digital video signal taken into the recording signal processing circuit 10 in the period W3 is a 24-bit digital signal.

Figures 3, 4:
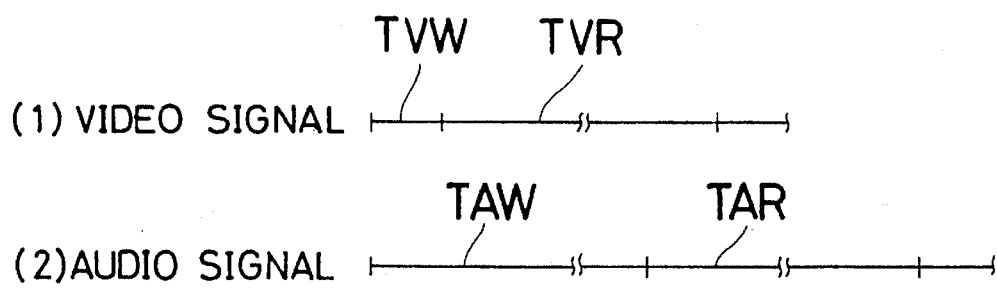
FIG. 3 is a timing chart showing the operation in recording.
FIG. 4 is a diagram showing a recording format of a magnetic tape.

FIG. 3 is a timing chart showing the action in recording, and FIG. 4 is a diagram showing a recording format of magnetic tape 11.

The image memories 6a, 6b possess a memory capacity P capable for storing the digital video signal for one field portion corresponding to the still picture for one screen portion. The period of one field is 1/60 sec, and the sampling frequency in the A/D conversion circuit 3 is 14.3 MHz, and the digital video signal d3 being sampled and converted is an 8-bit digital signal, and hence the memory capacity P is $$P = 14.3 \text{ (MHz)} \times 8 \text{ (bits)} \times 1/60 \text{ (sec)} \qquad (1)$$
$$= 1.911 \text{ (Mbits)}$$

Besides, the frequency of the changeover control signal LR1 is 32 kHz, and a 24-bit digital video signal is taken into the recording signal processing circuit 10 in one period of this changeover control signal LR1, and therefore the quantity of data R of the digital video signal stored in the image memory 6a that is read out in 1 sec is $$R = 32 \text{ (kHz)} \times 24 \text{ (bits)} \qquad (2)$$
$$= 768 \text{ (kbits/sec)}$$

In order that all digital video signals of one screen portion stored in the image memory 6a are read out, the required time is $$P/R = 1.911 \text{ (Mbits)}/768 \text{ (kbits/sec)} \quad (3)$$
$$= 2.49 \text{ (sec)}$$

Therefore, as shown in FIG. 3, the video signal entering from the input terminal VI is recorded in the magnetic tape 11 through the recording signal processing circuit 10 in the time corresponding to the sum of the writing period into memory TVW=1/60 and recording period into magnetic tape 11 TVR=2.49, that is, $$2.49 \text{ (sec)}+1/60 \text{ (sec)}=2.5 \text{ (sec)} \quad (4)$$

On the other hand, the audio signal entering from the input terminals RI, LI is once stored in the image memory 6b in the period TAW, but to write into all of memory region, it takes the time of 2.49 sec as expressed in formula (3). In the image memory 6b, only when digital audio signals are written in all of the memory region, the digital audio signals are sequentially read out from the first one written in and given to the P/S conversion circuit 7 in the period TAR.

Therefore, the digital audio signal led out from the P/S conversion circuit 7 to the input terminal 91, 92 of the changeover switch 9 is delayed by about 2.5 sec as compared with the audio signal entering from the input terminals RI, LI.

In this way, as shown in FIG. 4, after recording of digital video signals V1, V2, - - - , in the magnetic tape 11, digital audio signals A1, A2, - - - , corresponding to the recorded digital video signals are recorded. That is, the digital audio signal Ai is recorded in the magnetic tape 11 about 2.5 sec later than the corresponding digital video signal Vi.

Production

The signal read out from the magnetic tape 11 by the rotary head is given to the reproducing signal processing circuit 12, and is led out to the input terminal 34 of the changeover switch 13 as series signal bit by bit in synchronism with the fall of the clock signal CK1.

In the period W1, the led-out digital signal d6 is given to the D/A conversion circuit 14 as digital audio signal d7, and in the period W2, given as digital audio signal d8 to the D/A conversion circuit 15, and in the period W3, given as digital video signal d9 to the S/P conversion circuit 16.

That is, the digital signal d6 led out to the input terminal 34 in the periods W1, W2 is the digital audio signal corresponding to the speakers located at the front right side and front left side of the listener respectively, and the digital signal led out to the input terminal 4 in the period W3 corresponds to the digital video signal.

The digital video signal d10 produced from the S/P conversion circuit 16 is sequentially written into one of the two image memories 6a, 6b, for example, in the image memory 6a. Writing of digital video signals for one field portion into the image memory 6a is completed in the time of about 2.5 sec same as in the case of reading out the digital video signal from the image memory 6a to the recording signal processing circuit 10 in the above recording action.

In this way, when writing of digital video signals for one screen portion is over all digital video signals are read out from the image memory 6a in the time of 1/60 sec, and entered into the D/A conversion circuit 17.

While the digital video signals are being read out from the image memory 6a, the digital video signals corresponding to the next still picture are written into the other image memory 6b. Such actions are alternately repeated between the two image memories 6a, 6b.

As a result, in the display device connected to the output terminal VO, the still picture varying in a period of about 2.5 sec or more is displayed.

Of the digital signals d6 led out from the reproducing signal processing circuit 12 to the input terminal 34 of the changeover switch 13, the analog audio signal corresponding to the digital audio signals d7, d8 is delivered without delay from the output terminals RO, LO.

By contrast, the analog video signal corresponding to the digital video signal d9 is once stored in the image memories 6a, 6b, and is therefore led out to the output terminal VO about 2.5 sec later.

On the magnetic tape 11, however, the digital audio signal corresponding to the digital video signal expressing one still picture is recorded by delaying about 2.5 sec as mentioned above, and therefore the video signal led out to the output terminal VO and the audio signal led out to the output terminals RO, LO have the same corresponding relation as the corresponding relation of the video signal and audio signal entered from the input terminals VI, RI, LI at the time of recording. That is, the picture and sound are reproduced while maintaining the initial corresponding relation.

Figure 5:
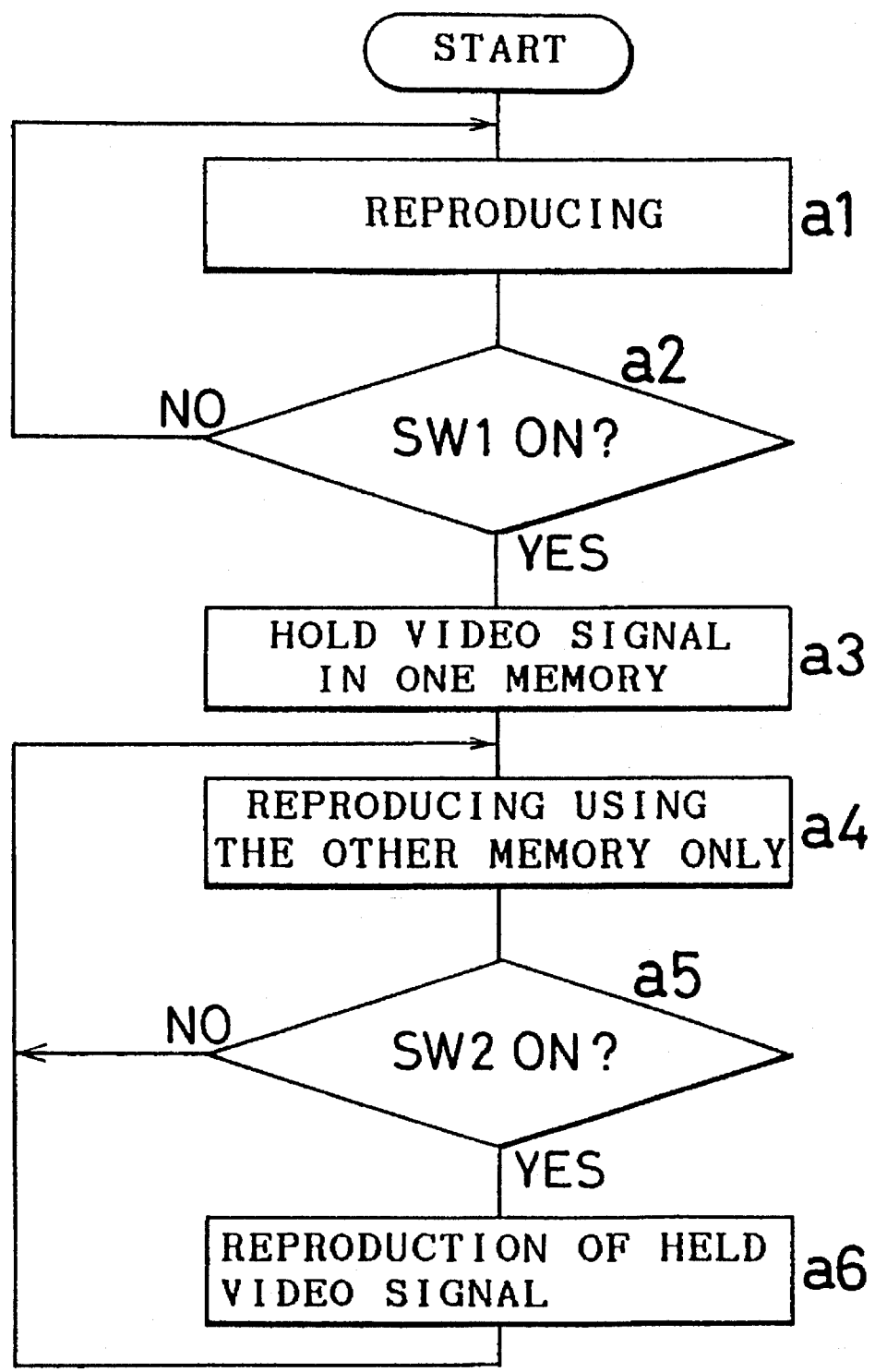
FIG. 5 is a flow chart showing the reproducing action of the data recording and reproducing apparatus in the embodiment.

FIG. 5 is a flow chart for explaining the reproducing action in the data recording and reproducing apparatus of the same embodiment. In step a1, the above reproduction action is executed. In step a2, when it is detected that the memory indication switch SW1 is turned on, in step a3, the video signal being read out at the time is directly held in the image memory.

In step a4, the reproducing action is effected by using only the image memory not preserving the video signal. Hence, for example, when the video signal is maintained in the image memory 6a, the video signal is reproduced by using the image memory 6b only. In this time, while writing the digital video signal corresponding to the image memory 6b, there is no digital video signal to be read out. That is, in the memory 6a, since the video signal is maintained, other video signal cannot be written in the image memory 6a. Therefore, while writing the video signal in the image memory 6b, the blue back signal to make the display screen blue is delivered from the character generating circuit 19.

In step a5, it is judged whether the reproduction indication switch SW2 is turned on or not. When the reproduction indication switch SW2 is turned on, the previously maintained video signal is read out (reproduced) from the image memory in step a6.

Thus, according to the embodiment, of the video signals recorded in the magnetic tape 11, a desired video signal may be maintained in either one of the image memories 6a, 6b, and the maintained video signal may be read out and reproduced whenever required.

Therefore, by maintaining the frequency reproduced video signal in the image memory and reproducing as required, it is not necessary to record the same video signal plural times on the same magnetic tape 11, and therefore the recording efficiency of the magnetic tape 11 is improved. Moreover, it is not necessary to search the magnetic tape 11 every time the video signal to be reproduced is needed, and the waiting time until display of video signal may be shortened.

As the application of the data recording and reproducing apparatus of the invention, various uses are considered, including the personal automation (PA) appliances such as personal information station, professional office automation appliances such as electronic catalogues, electronic notebooks, electronic memo, and memo facsimile devices. For example, when the data recording and reproducing apparatus of the invention is used as an electronic catalogue, when explaining a specific electric product, the video signal of the display screen showing the entire image of the electronic product is stored for example, in the image memory 6a, and the detailed magnified picture of the parts of the electronic product and the explanatory comments are reproduced by using the image memory 6b, and when desired to reproduce the general picture, it may be immediately reproduced by Dressing the reproduction indication switch SW2. Thus, the scope of application of the data recording and reproducing apparatus is extended.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A system for reproducing digital acoustic and video signals recorded on a magnetic tape, comprising:

means for sequentially reading blocks of digital video signals and audio signals that correspond to the blocks of digital video signals from the magnetic tape;

first and second memories;

a memory controller for alternately writing sequentially retrieved blocks of video signals from the magnetic tape into the first and second memories wherein as one block is written into one of the memories, a block previously written in the other of the memories is read out and reproduced along with corresponding audio signals retrieved from the magnetic tape;

a first switch actuable for interrupting the writing and reading of alternate blocks of video signals into the first and second memories and selectively maintaining a specified block of video signals in one of the first and second memories, wherein subsequently retrieved blocks of video signals from the magnetic tape are sequentially written in and read from the other of the first and second memories during the time the specified block of video signals is maintained in the one memory; and a second switch actuable for substantially immediately reading out the specified block of video signals from the one memory.

2. The system according to claim 1, further comprising:

means for converting the retrieved video and corresponding audio signals into analog format.

3. The system according to claim 1, further comprising:

a character generator for generating a default video display signal when the first switch is actuated and a block of video signals is being written into the other memory.

4. The system according to claim 1, wherein the corresponding audio signals are stored on the magnetic tape a predetermined time after the blocks of digital video signals such that when a block of digital video signals is read from one of the memories, the corresponding audio signals are retrieved from the magnetic tape.

5. A method for reproducing video and audio signals which have been stored in digital form on a magnetic storage media, comprising:

retrieving a block of video signals and audio signals corresponding to the block of video signals from the magnetic storage media;

alternately writing a sequence of blocks of retrieved video signals in first and second image memories;

alternately reading the sequence of blocks of video signals from the first and second image memories to be reproduced along with their corresponding audio signals such that as a block of video signals is being written into one of the memories, a preceding block of video signals previously stored in the other of the memories is read out;

detecting whether a block of video signals is selected to be retrieved out of alternate reading sequence based on activation of a first switch;

holding the selected block in the first memory; and reading out the selected block from the first memory in response to an external event.

6. The method according to claim 5, wherein the external event is activation of a second switch.

7. The method according to claim 5, further comprising:

while the selected block of video signals is being held in the first memory, writing subsequent sequential blocks of video signals into the second memory.

8. The method according to claim 7, further comprising:

generating a predetermined video signal during time periods when the subsequent sequential blocks of video signals are being written into the second memory.

9. The method according to claim 5, further comprising:

converting read out blocks of video and corresponding audio signals into analog format.

10. The method according to claim 5, wherein the corresponding audio signals are stored on the magnetic storage media a predetermined time after the corresponding block of digital video signals such that when the block of digital video signals is read from one of the memories, the corresponding audio signals are retrieved from the magnetic storage media.

11. A system for reproducing digital acoustic and video signals recorded on a magnetic tape, comprising:

means for sequentially reading blocks of digital video signals and audio signals corresponding to each block of digital video signals from the magnetic tape;

first and second memories for storing blocks of the video signals read from the magnetic tape; and a memory controller for controlling access to the first and second memories to store sequential blocks of video signals in either of the first and second memories and to read out the blocks of video signals stored in one of the first and second memories when video signals are being stored in the other memory so that blocks of video signals are reproduced along with corresponding audio signals retrieved from the magnetic tape;

means for holding a specified block of video signals in one of the first and second memories for a time period longer than the time required to store and read out one block of video signals from either the first or second memory; and means for retrieving the held block of video signals in accordance with an external event.

12. The system according to claim 11, wherein the blocks of video signals are alternately stored and read out of the first and second memories.

13. The system according to claim 12, wherein the means for storing stores the sequential blocks of video signals only in the other of the first and second memories when the means for holding holds the specified block of video signals in the one memory.

14. The system according to claim 12, further comprising:
a character generator for generating a default video display signal when the means for holding holds the specified block of video signals in the one memory and a block of video signals is being written into the other memory.

15. The system according to claim 11, wherein the external event is the actuation of a switch.

16. The system according to claim 11, wherein a switch is activated to indicate the specified block of video signals to be held.

17. The system according to claim 11, wherein the corresponding audio signals are stored on the magnetic tape a predetermined time after the corresponding blocks of digital video signals such that when a block of digital video signals is read from one of the memories, the corresponding audio signals are retrieved from the magnetic tape.

* * * * *

UNITED STATES PATENT AND TRADEMARK OFFICE
CERTIFICATE OF CORRECTION

PATENT NO. : 5,521,766
DATED : May 28, 1996
INVENTOR(S) : MINODA et al.

It is certified that error appears in the above-identified patent and that said letters patent is hereby corrected as shown below:

Title page, item
"[63] Continuation of Ser. No. 871,754, Apr. 2, 1992, abandoned", should read
--[63] Continuation of Ser. No. 871,754, Apr. 21, 1992, abandoned --.

Signed and Sealed this

Thirty-first Day of December, 1996

*Attest:*

BRUCE LEHMAN

*Attesting Officer*     *Commissioner of Patents and Trademarks*